United States Patent
Zingel et al.

[11] Patent Number: 5,899,566
[45] Date of Patent: May 4, 1999

[54] REACTOR FOR CORROSIVE REACTION MIXTURES

[75] Inventors: Siegfried Zingel; Wilfried Burow; Martin Anstock; Dieter Zeitz; Olaf Schmidt-Park, all of Krefeld, Germany

[73] Assignee: Bayer Aktiengesellschaft, Leverkusen, Germany

[21] Appl. No.: 08/878,320

[22] Filed: Jun. 18, 1997

[30] Foreign Application Priority Data

Jun. 25, 1996 [DE] Germany .................. 196 25 264

[51] Int. Cl.⁶ .................. B01F 5/26; B01F 5/12
[52] U.S. Cl. .......................... 366/266; 422/227
[58] Field of Search .................. 366/101, 102, 366/149, 156.1, 183.1, 133, 266, 318; 159/DIG. 29; 422/227, 225

[56] References Cited

U.S. PATENT DOCUMENTS

| | | | |
|---|---|---|---|
| 2,530,814 | 11/1950 | Becze et al. | 366/266 |
| 3,318,582 | 5/1967 | Fisher | 366/266 |
| 3,653,424 | 4/1972 | Carlsson | 159/16.1 |
| 3,898,745 | 8/1975 | Carlsson | 159/DIG. 29 |
| 4,007,016 | 2/1977 | Weber | 366/266 |
| 4,391,529 | 7/1983 | Hedrich et al. | 366/266 |
| 4,968,349 | 11/1990 | Virtanen | 366/266 |

FOREIGN PATENT DOCUMENTS 1313968  11/1961  France .................. 366/266

*Primary Examiner*—Tony G. Soohoo
*Attorney, Agent, or Firm*—Sprung Kramer Schaefer & Briscoe

[57] ABSTRACT

A reactor for corrosive and abrasive reaction mixtures having an upper setion and a conically tapered lower reaction section, with a screw mixer consisting of a jacketed band surrounding a conveyor screw, suspended fron the top of the reactor, and an inlet for solid reactants which leads directly into the vertical conveying device.

9 Claims, 1 Drawing Sheet

REACTOR FOR CORROSIVE REACTION MIXTURES

The invention relates to a reactor for corrosive, highly viscous reaction mixtures, in particular for the industrial treatment of suspensions of abrasive solids in a liquid reaction phase, for example a reaction mixture for the reduction of organic compounds with metals. The reactor has an internal vertical conveying device which allows the product to be circulated without damaging the reactor and facilitates the introduction of solids in ongoing processes.

BACKGROUND OF THE INVENTION

In the industrial treatment and mixing of corrosive reaction mixtures containing abrasive solid particles, conventionally designed mixing devices or reactors undergo considerable wear. Such reactors are therefore for example produced from standard steel and have to be equipped with acidproof cladding as well as a brickwork lining.

The reactants and the products formed in the course of the process are conventionally mixed with the aid of agitators.

The liquid reactants are normally introduced into the reactor from the top through the gas phase. Depending on the process, the solid components, which can be fine, dusty and abrasive, are initially placed in the reactor or added in the upper section thereof, and thus also first pass through the gas phase.

The known reactor designs do however have a number of considerable defects and disadvantages which restrict the manner in which the process is carried out, reduce the operative reliability of the unit concerned and result in high costs from the point of view of maintenance and servicing. Thus, the combination of materials consisting of standard steel, acidproof cladding and a brickwork lining only provides inadequate resistance to the abrasive reaction mixtures.

A further disadvantage arises when for example exothermic reactions take place in the reactor. In such cases the brick lining has an unfavourable effect since any heat of reaction liberated in the course of the reaction concerned has to be dissipated. In known bricklined reactors it is impossible to dissipate the heat of reaction via the surface of the reactor and to utilise it for example for the recovery of energy in the form of steam or hot water.

A further disadvantage is that it is only possible with difficulty and in a relatively non-reproducible manner to extract samples merely from the top of the reactor.

The known agitators used, which are usually multicomponent, complicated and costly structures made of various types of materials, are comparatively susceptible to wear. Their mixing effect is also highly limited, particularly when the mixing properties of the liquid, organic and solid-containing phases are unfavourable.

If the liquid reactants are introduced into the reaction mixture via the gas phase, the differences in the density and viscosity of the phases to be mixed mean that a certain portion of the starting materials introduced remains on the interface of contact with the gas phase and does not take place in the required reaction immediately, or possibly only very slowly.

The introduction of the solid via the gas phase has the disadvantage that, especially in the case of dusty solids, fine particles are discharged with the vapour stream and are deposited in all the undesirable parts of the reactor, the agitator shaft or the downstream sections of the reactor. Such deposits form extremely compact, rigid encrustations which have an unfavourable effect on or considerably impair the production process.

The object of the invention was to provide a reactor and a mixing device which do not have the abovementioned disadvantages, allow a longer period of operation and possibly an increased service life and allow the throughput of starting materials to be increased while correspondingly modifying the method of procedure.

SUMMARY OF THE INVENTION

This object is achieved according to the invention by a reactor for corrosive and possibly highly viscous reaction mixtures, in particular for the industrial treatment of dispersions of abrasive solids in a liquid and/or highly viscous reaction phase, consisting of an optionally cylindrical upper reactor section and a conically tapered lower reactor section, a vertical conveying device, preferably a screw mixer, consisting of a jacketed barrel and a conveyor screw which is arranged in the reactor in a form vertically suspended from the top of the upper reactor section and conveys the material concerned in a countergravitational direction, wherein the open inlet of the bottom end of the conveying device extends down to the conical tip of the bottom reactor section and the upper end of the conveying device has outlet openings below the lid of the reactor, comprising a feed pipe for liquid reactants and an outlet for the reaction mixture at the base of the reactor, a solids inlet and optionally an inlet or outlet for gaseous reaction components.

DETAILED DESCRIPTION

The shape of the reactor and the vertically acting conveying device, preferably a mixing screw, which conveys the reaction mixture in a vertical upward direction, allow the product to be circulated in the reactor by means of a vertical circulating movement.

The reactor according to the invention can be fitted all over or partially with a double jacket in which heat is exchanged with the reaction mixture with the aid of a heat exchange medium.

Other preferred embodiments are described in the subclaims.

The vertical circulation of reactants is for example produced by a dynamic screw mixer with a central jacketed barrel which forcedly conveys the solids and the liquid viscous phase from the reactor base to the top of the reactor, from where they are discharged. Due to the intake of the product material in the lower reactor section and its discharge from the upper reactor section a vertical loop movement of the contents of the reactor is produced.

The use of a metallic reactor of the design and shape according to the invention as well as the correspondingly adapted use of a screw mixer with a specific stirring technique provides a number of advantages compared with the type of apparatus so far known.

A metallic reactor design without a brickwork lining does not prevent the use of process variants (the introduction and removal of product or auxiliary materials, etc.) in the required positions and is accessible from all sides of the reactor for modifications to and adjustments of the reactor.

The internal metallic reactor surface allows the additional dissipation of heat by means of heat transfer (e.g. the production of hot water in a cylindrical double jacket).

The ceramic lining of known reactors, which is sensitive to cracks under the effect of impact and jolts as well as the underlying acidproof rubber coating for the standard steel are not present in the reactor according to the invention, and as a result the investment and repair costs of the reactor according to the invention are reduced. In order to protect the reactor against abrasive wear, which inevitably occurs, even though to a lesser extent, (in the lower vessel section) the use of a replaceable steel cladding made of suitable materials and having a long service life is possible.

The preferred steel design also considerably facilitates the extraction of samples from ongoing processes, since there are no limits to the site at which samples are extracted.

The preferable incorporation and use of a screw mixer in the reactor according to the invention allows the various starting materials to be forcedly and intensively mixed by means of high shearing forces in a section of the reactor which is continuously traversed. As a result, phase separation, the formation of layers and the possible formation of clusters of non-consumed reactants in a heterogeneous mixture of compounds and phases, as repeatedly occurs in known reactors, is prevented.

The amount of energy required to operate the mixer is considerably less than that required for operating conventional agitators, since the driving power is used almost exclusively for the forced mixing in the mixing chamber traversed in a vertical upward direction and only comparatively low friction losses occur. The reaction mixture is forcedly conveyed to the top of the reactor and then moves downwards again by virtue of its own weight in the direction of the reactor base without any additional energy consumption. Solid and liquid reaction components are supplied to the reactor according to the invention in such a manner that they automatically come into contact with each other after their entry (thereby accelerating the reaction and increasing the conversion rate) and are preferably mixed and conveyed in a screw mixer. The same also applies to any reflux condensate formed, which does not flow back through the gas phase on to the contents of the reactor but can be introduced directly into the liquid phase.

Due to the preferred introduction of the fine, dusty solids directly into the mixing chamber of the screw mixer and thus away from the gas chamber directly into the liquid/solid phase, the off-gas stream formed is almost completely free of entrained solid particles. As a result, the blockage of the downstream units which interferes with the process is almost completely prevented and costs as well as breakdown periods for repair and cleaning work are avoided.

The invention also relates to the use of the reactor in processes in which corrosive and/or highly viscous reaction mixtures and/or abrasive solids are used. The abovementioned processes include reactions of organic components with metals. Suitable organic components are for example reducible substances such as for example aliphatic or aromatic carboxylic acids, aldehydes, ketones, nitro or nitroso compounds, and metals such as for example Li, Na, K, Mg, Ca, Al, B, Ti, V, Fe, Cr, Mn, Fe, Co, Ni, Cu, Zn and Si can be used as the metallic reactant.

BRIEF DESCRIPTION OF THE DRAWING

The invention is illustrated in more detail below with the aid of FIG. 1, without this representing any limitation.

In FIG. 1, the reactor 1 produced from suitable metallic materials such as super duplex steel or highly alloyed austenitic steel, according to requirements is illustrated, together with some peripheral machine parts. In this FIGURE reactor 1 has a double jacket 2, in particular in the cylindrical jacket region, for the dissipation of the heat of reaction and condensation. The cooling agent used is water, for example for the production of hot water or steam. The reactor consists of a cylindrical upper section 16 and a conical lower section 17, the relationship between the height and diameter of the apparatus being appropriately adjusted. The apex angle (~75°) of the conical reactor tip forming the, base of the vessel is adjusted so that the bottom end (19) of the corresponding screw mixer 3 seizes the solids 20 moving towards the reactor base 4 as completely as possible and simultaneously rotates the entire reactor contents 22 with the best possible degree of efficiency. The apex angle is in the range of 65° to 100°. The screw mixer 3 is arranged centrally in reactor 1 in a vertically suspended form and consists of a jacketed barrel 14 and a corresponding mixing/conveyingscrew 15. Outlet openings 5 are arranged just below the top 18 of the reactor so that the reaction products conveyed upwards in the screw mixer 3 from the base 4 to the top 18 of the reactor can issue from the jacketed barrel 14. The jacketed barrel (14) is suspended in the reactor and screwed to the top 18 of the reactor from the exterior.

Figure 1:
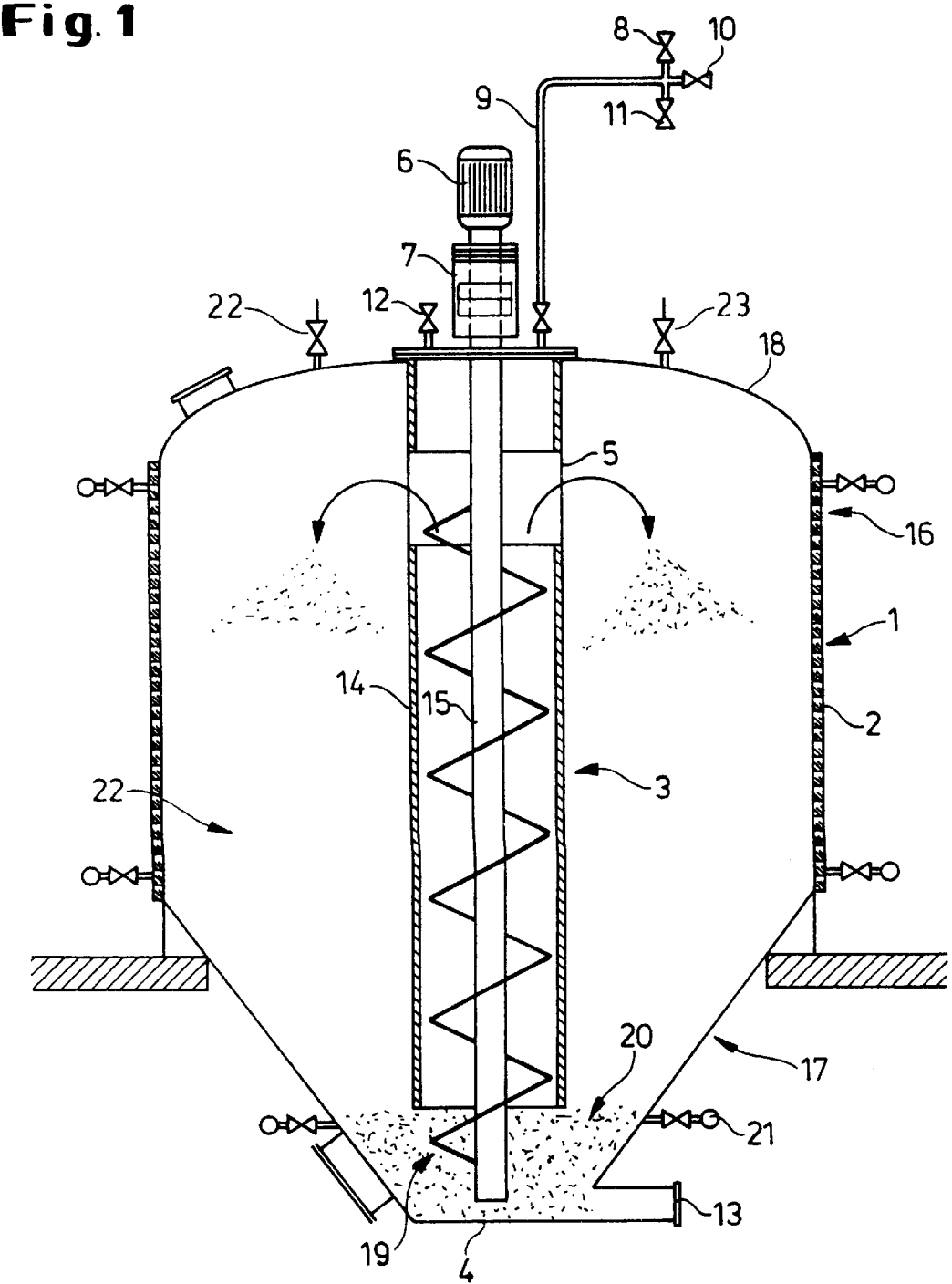
FIG. 1 shows a longitudinal section through a reactor according to the invention.

The spiral helices of the mixing screw 15 extend almost down to the reactor base 4 and end at the top approximately at the same level as the outlet openings 5 in the jacketed barrel 14. The screw mixer 3 is driven by a motor 6 with a variable speed of rotation, so that the speed of rotation can be adjusted to the individual viscosity gradient of the reaction mixture or the individual processing state. The required driving power for the screw mixer 3 is considerably lower than the electric power hitherto required for a conventional agitator. The viscosity of the suspension of starting materials which possibly increases during the reaction process, is limited via the addition of liquid reactants or diluents via feed pipe 9 which feed directly into the jacketed barrel (14).

The screw mixer 3 itself is connected to the driving motor 6 via a magnetically coupled drive 7, possibly with an additional rinsing means and an additional labyrinth seal, so that the principle of an absolutely airtight, closed reactor is fulfillled.

Precisely in the same way as the introduction of water 8 or steam the introduction of the liquid, organic reactants 10 and the reflux component 11 takes place via a common feed pipe 9 from above directly into the mixing chamber of the screw mixer 3 formed by jacketed barrel 14.

The reaction components are thus seized directly by the mixing screw 15 and intensely mixed with the solids 20, which are also introduced from the top, to form a paste, as a result of which the reaction is intensified or accelerated. The solids 20 to be added during the process are introduced from above directly into the screw mixer 3 via inlet 12 and mixed with the reaction liquid in order to avoid the vigorous formation of dust which would otherwise occur and any resulting encrustations in the reactor gas chamber.

In addition to the introduction from above, several feed pipes 21 are distributed around the periphery of the reactor base 4 (inlet in the direction of the base) for, for example, water, steam and liquid reactants or auxiliaries which are also simultaneously available for rinsing and purification purposes.

The reactor 1 is emptied via a laterally arranged pipe 13 at the base 4 of the conical lower section 17.

We claim:

1. Reactor (1) for corrosive reaction mixtures containing abrasive solids, consisting of an upper reaction section (16)

and a conically tapered lower reaction section (17), and having a vertical conveying device consisting of a jacketed barrel (14) surrounding a conveyor screw (15), suspended from the top (18) of the reactor, said vertical conveying device charging material from the bottom of the reactor in an upwardly direction towards the top of the reactor, said vertical conveying device having an open lower end which extends down to the conical tip of the lower reaction section (17), which serves as an inlet through which material at the bottom of the reactor enters the vertical conveying device, and an upper end which has outlet openings (5) through which material conveyed to said upper end by said vertical conveying device passes out of said vertical conveying device and into the reactor space outside of said vertical conveying device, said reactor having an inlet (9) for liquid reactants, an inlet (12), which leads directly into said vertical conveying device, for solid reactants and an outlet (14) at the bottom of the reactor.

2. Reactor according to claim 1, wherein said conically tapered lower reaction section (17) has an apex angle of 65° to 100°.

3. Reactor according to claim 1, wherein liquid inlet (9) leads directly into said vertical conveying device.

4. Reactor according to claim 1, wherein the upper reactor section (16) has a double jacket (2) through which a heat exchange medium is passed for the purpose of heat exchange with reactor (1).

5. Reactor according to claim 1, wherein the vertical conveying device (15) is driven by a magnetically coupled drive (7).

6. The reactor of claim 5 wherein said vertical conveying device is a screw conveyor.

7. The reactor of claim 5 further comprising means for rinsing said magnetically coupled drive (7).

8. The reactor of claim 1, further comprising a gas inlet (22), gas outlet (23) or both.

9. A method for reacting organic components with metals, which comprises introducing said organic components and said metals into a reactor according to claim 1, and reacting them with each other in said reactor.

* * * * *

UNITED STATES PATENT AND TRADEMARK OFFICE
CERTIFICATE OF CORRECTION

PATENT NO : 5,899,566
DATED : May 4, 1999
INVENTOR(S): Siegfried ZINGEL, et al.

It is certified that error appears in the above-identified patent and that said Letters Patent is hereby corrected as shown below:

Title Page        Abstract: line 2, delete "setion" and substitute --section--; line 4, delete "fron" and substitute --from--.

Signed and Sealed this

Thirtieth Day of May, 2000

*Attest:*

Q. TODD DICKINSON

*Attesting Officer*      *Director of Patents and Trademarks*